United States Patent
Lee

(10) Patent No.: US 11,281,306 B2
(45) Date of Patent: *Mar. 22, 2022

(54) INPUT DEVICE WITH KEY INPUT AND TOUCH INPUT, AND OPERATING METHOD THEREOF

(71) Applicant: PixArt Imaging Inc., Hsin-Chu County (TW)

(72) Inventor: Chia-Yi Lee, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/951,123

(22) Filed: Nov. 18, 2020

(65) Prior Publication Data
US 2021/0072837 A1 Mar. 11, 2021

Related U.S. Application Data

(63) Continuation of application No. 15/409,035, filed on Jan. 18, 2017, now Pat. No. 10,884,511.

(30) Foreign Application Priority Data

Jun. 21, 2016 (TW) .................. 105119443

(51) Int. Cl.
*G06F 3/02* (2006.01)
*G06F 3/041* (2006.01)
*G06F 3/044* (2006.01)

(52) U.S. Cl.
CPC ............ *G06F 3/0202* (2013.01); *G06F 3/044* (2013.01); *G06F 3/0416* (2013.01); *G06F 2203/04111* (2013.01)

(58) Field of Classification Search
CPC .... G06F 3/016; G06F 3/0414; G06F 3/04144; G06F 2203/04107; G06F 2203/04111; G06F 3/044–0448; G06F 2203/041–04809; G06F 2203/0339; G06F 3/0202; G06F 3/0416; G06F 3/0443; G06F 3/0446; G06F 3/02; H01H 13/52; H01H 13/7006; H01H 13/702; H01H 2003/0293; H01H 2203/038; H01H 2205/026; H01H 2205/03; H01H 2215/004; H01H 2215/012; H01H 2225/018; H01H 2227/004; H01H 2227/022; H01H 2227/026; H01H 2227/0261; H01H 2239/006; H01H 13/00–88; H01H 2227/00–036; H01H 2239/018; H03K 17/955; H03K 17/962;
(Continued)

(56) References Cited

U.S. PATENT DOCUMENTS

2009/0128511 A1 5/2009 Sinclair et al.
2010/0224474 A1* 9/2010 Jeffery ................. H01H 13/704
200/512
(Continued)

*Primary Examiner* — Amr A Awad
*Assistant Examiner* — Aaron Midkiff
(74) *Attorney, Agent, or Firm* — WPAT, PC

(57) ABSTRACT

An input device including a plurality of press buttons and a touch control area is provided. The press buttons provide a key input function, and the touch control area provides a touch input function. Each of the press buttons pushes against an elastic pad which is used as a sensing electrode of the touch input function and as an elastic recovery element of the key input function.

19 Claims, 7 Drawing Sheets

(58) Field of Classification Search
CPC ............... H03K 17/967; H03K 17/975; H03K 2017/9755; H03K 2217/960755; H03K 2217/96076; H03K 2217/960765; H03K 17/96–969; H03K 2217/960775; H03K 2017/9602–9634; H03K 2217/96077
USPC ........................................ 200/406, 513, 516
See application file for complete search history.

(56) References Cited

U.S. PATENT DOCUMENTS

| | | | |
|---|---|---|---|
| 2010/0291973 A1* | 11/2010 | Nakahara | G06F 3/0446 455/566 |
| 2011/0175671 A1* | 7/2011 | Reynolds | H03K 17/962 327/517 |
| 2014/0267043 A1* | 9/2014 | Kaiser | G06F 3/04883 345/168 |
| 2014/0327644 A1 | 11/2014 | Mohindra | |
| 2015/0301651 A1 | 10/2015 | Leigh et al. | |
| 2015/0331535 A1 | 11/2015 | Li et al. | |

* cited by examiner

100

INPUT DEVICE WITH KEY INPUT AND TOUCH INPUT, AND OPERATING METHOD THEREOF

CROSS REFERENCE TO RELATED APPLICATION

This application is a continuation application of U.S. patent application Ser. No. 15/409,035 filed on Jan. 18, 2017, which claims the priority benefit of Taiwan Patent Application Serial Number 105119443, filed on Jun. 21, 2016, the full disclosure of which is incorporated herein by reference.

BACKGROUND

1. Field of the Disclosure

This disclosure generally relates to an input device, more particularly, to an input device with push-button input and touch input and an operating method thereof.

2. Description of the Related Art

The conventional push-button keyboard only has the function of push-button input. A user can input only by pressing a key on the keyboard. However, interactive electronic devices may have more functions such that only having the function of push-button input cannot satisfy the requirement of various input controls. Accordingly, the conventional push-button keyboard may limit applications of the interactive electronic devices.

Accordingly, the requirement of an input device having both the push-button input function and the touch input function is increasing so as to improve the user experience in operating the interactive electronic devices.

SUMMARY

The present disclosure is to provide an input device having both the push-button input function and the touch input function and an operating method thereof that implement both the push-button input and touch input by detecting the capacitance variation.

The present disclosure is further to provide an input device having both the push-button input function and the touch input function that has a dome pad used as a part of the detection electrode of a capacitive sensor.

The present disclosure provides an input device including a substrate, a first electrode group, a second electrode group, a plurality of ground electrodes and a plurality of elastic pads. The first electrode group, the second electrode group and the plurality of ground electrodes are arranged at a same level on the substrate. The first electrode group includes at least one first electrode formed on the substrate, and the at least one first electrode extends along a first direction of the substrate. The second electrode group includes a plurality of second electrodes, wherein the plurality of second electrodes are arranged as multiple separated rows, and each of said multiple separated rows includes multiple second electrodes separately arranged along a second direction of the substrate. The plurality of ground electrodes are separately formed on the substrate, wherein each of the plurality of ground electrodes is respectively arranged between two adjacent second electrodes in one of said multiple separated rows. Each of the plurality of elastic pads crosses over the at least one first electrode and one of the ground electrodes along the second direction of the substrate to electrically contact the two adjacent second electrodes in one of said multiple separated rows and at two sides of the first electrode crossed thereby.

The present disclosure further provides an operating method of an input device that includes a drive end coupled to the first electrode group and a receiving end coupled to the second electrode group. The operating method includes the steps of: driving the first electrode group with a drive signal to form a first inductive capacitor between the first electrode group and the second electrode group and form a second inductive capacitor between the elastic pads and the ground electrodes; reading a capacitance decrease of the first inductive capacitor to identify a touch input; and reading a capacitance increase of the second inductive capacitor to identify a push-button input.

The present disclosure further provides an input device including a substrate, a first electrode group, a second electrode group and a plurality of elastic pads. The first electrode group and the second electrode group are arranged at a same level on the substrate. The first electrode group includes at least one first electrode formed on the substrate and extends along a first direction of the substrate, wherein the at least one first electrode comprises a plurality of main body parts and a plurality of connecting parts each connecting two of the plurality of main body parts, and a width in a second direction of each of the main body parts is larger than that of each of the connecting parts. The second electrode group includes a plurality of second electrodes, wherein the plurality of second electrodes are arranged as multiple separated rows, and each of said multiple separated rows includes multiple second electrodes separately arranged along the second direction of the substrate. Each of the plurality of elastic pads crosses over one of said plurality of connecting parts of the at least one first electrode along the second direction of the substrate to electrically contact two adjacent second electrodes in one of said multiple separated rows and at two sides of the connecting part crossed thereby.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
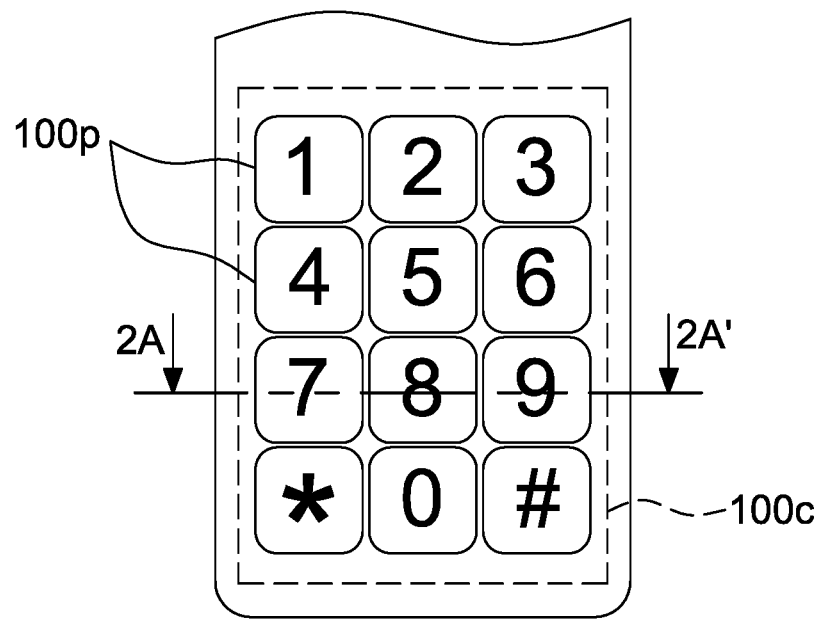
FIG. 1 is a schematic diagram of an input device according to one embodiment of the present disclosure.

Referring to FIG. 1, it is a schematic diagram of an input device according to one embodiment of the present disclosure. For example, the input device 100 is a keyboard, which is within a touch control area 100c, of a portable electronic device. A user may input characters such as a symbol, a number or a letter to be shown on a display or control the operation of application software through a plurality of push buttons 100p. It should be mentioned that the input device 100 of the present disclosure is not limited to be adapted to portable electronic devices, and is adaptable to any electronic system which interacts with users via a keyboard module.

Figure 2:
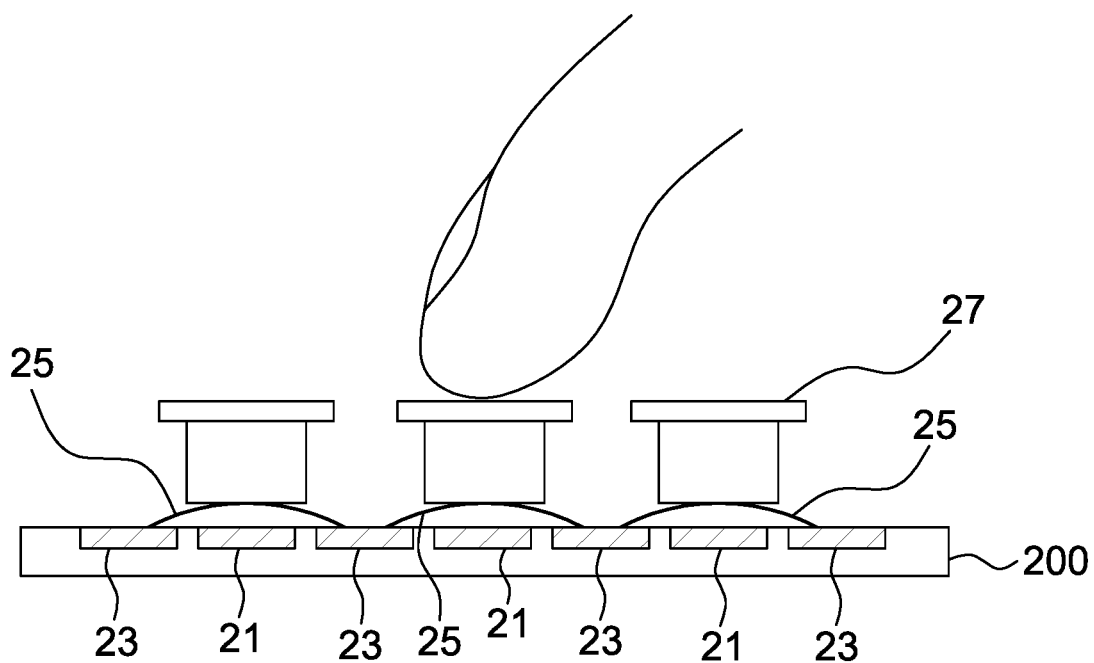
FIG. 2 is a cross sectional view of the input device taken along line 2A-2A' in FIG. 1.

Referring to FIG. 2, it is a cross sectional view of the input device 100 taken along line 2A-2A' in FIG. 1. The input device 100 includes a substrate 200 and a plurality of push buttons 27 (e.g., twelve push buttons shown in FIG. 1). The push buttons 27 are made of, for example, acrylic material, glass material or plastic material. The push buttons 27 are separated from one another or connected together via a connecting structure. The push buttons 27 may be manufactured by conventional methods without particular limitations as long as each of the push buttons 27 includes a key cap for being pressed by users and a pillar connected to the key cap.

The substrate 200 is, for example, a printed circuit board (PCB) or a flexible board for disposing circuits and electronic elements. A plurality of patterned first electrodes 21 and a plurality of patterned second electrodes 23 are formed on the substrate 200 to generate the inductive capacitor therebetween. The first electrodes 21 and the second electrodes 23 are formed, e.g., by the same manufacturing procedure, at the same layer of the substrate 200, but not limited to. It is possible that the first electrodes 21 and the second electrodes 23 are at different layers of the substrate 200. A plurality of elastic pads 25 are further formed on the substrate 200 and electronically connected two adjacent second electrodes 23. The elastic pads 25 are, for example, metal dome pads or metal snap domes to respectively push against the pillars of the push buttons 27. Accordingly, if an external force presses on the key cap of one of the push buttons 27, the pillar of the one push button 27 applies force on the corresponding elastic pad 25 to deform the elastic pad 25. When the external force disappears, the deformed elastic pad 25 recovers to its original state or position.

In the present disclosure, although the material and the shape of the elastic pads 25 are not particularly limited, the elastic pads 25 are preferably conductors since the elastic pads 25 are also used as detection electrodes of the capacitive detection.

In some embodiments, the elastic pads 25 do not directly push against the push buttons 27. For example, the elastic pads 25 are fixed on the substrate 200 by an elastic layer, i.e. an elastic layer being sandwiched between the elastic pads 25 and the pillars of the push buttons 27. The elastic layer has functions of both fixing the elastic pads 25 and buffering between the elastic pads 25 and the pillars of the push buttons 27. It is possible to fix the elastic pads 25 on the substrate 200 using conventional methods without particular limitations as long as the top of the elastic pads 25 directly or indirectly pushes again the push buttons 27 and the elastic pads 25 are used as the connecting bridge of the second electrodes 23.

Figure 3:
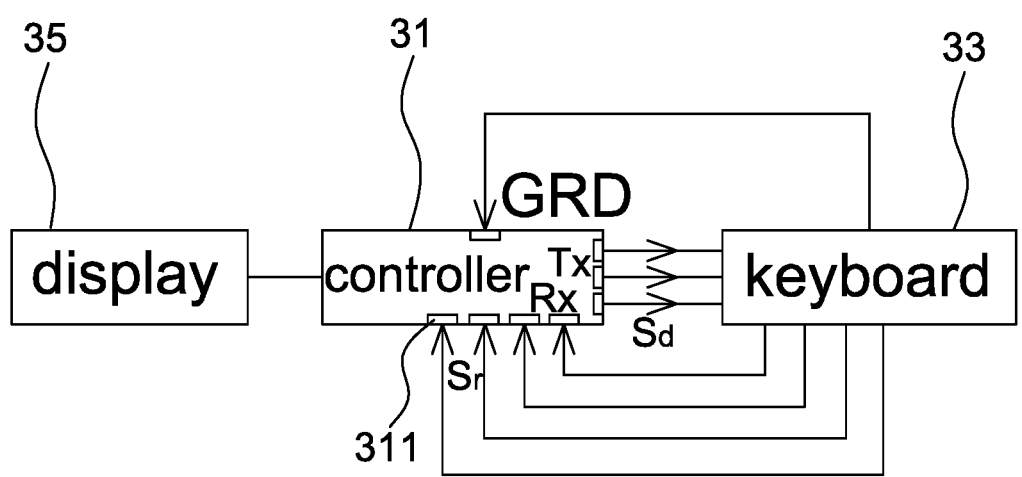
FIG. 3 is a schematic block diagram of an input device according to one embodiment of the present disclosure.

Referring to FIG. 3, it is a schematic block diagram of an input device according to one embodiment of the present disclosure. In some embodiments, the input device 100 includes a controller 31 and a keyboard module 33 electrically connected together through at least one bus bar. In some embodiments, the input device 100 further includes a display 35 electrically connected to the controller 31. In some embodiments, the display 35 is not included in the input device 100 but electrically coupled to the controller 31 in a wired manner. In some embodiments, the input device 100 includes the keyboard module 33 without including the controller 31, and the controller 31 is included in a host (not shown), such as a computer system which is wired or wirelessly connected to the keyboard module 33.

The controller 31 is, for example, a control chip, a central processing unit, a microcontroller or an application specific integrated circuit (ASIC) which receives a detected signal Sr from the keyboard module 33 to perform corresponding controls, e.g., performing a push-button input control and/or a touch input control. The push-button input control is, for example, to show characters on the display 35 inputted from the push buttons. The touch input control includes, for example, at least one of a gesturing control, a scrolling control, a zooming control, a clicking control and a cursor control. The push-button input control and the touch input control are implemented by software, hardware, firmware or a combination thereof.

For example, the controller 31 includes a plurality of pins 311 electrically connecting to the keyboard module 33 via the bus bar. For example, the controller 31 includes drive pins used as a drive end (Tx) for inputting the drive signal Sd to the keyboard module 33, and includes detection pins used as a receiving end Rx for receiving the detected signal Sr from the keyboard module 33. In some embodiments, the controller 31 further includes a ground pin GRD connected to ground electrodes of the keyboard module 33 (described hereinafter), wherein whether the ground pin GRD is included is determined according to different applications.

The drive signal Sd is, for example, a continuous signal (e.g., sinusoidal wave) or a digital signal without particular limitations. The controller 31 identifies the capacitance variation according to the detected signal Sr (e.g., according to the voltage variation, frequency variation, variation of charging and discharging time intervals) to identify the user operation and perform the corresponding control. It is possible to identify the capacitance variation using any conventional detecting method in capacitive touch control without particular limitations.

Figure 4A:
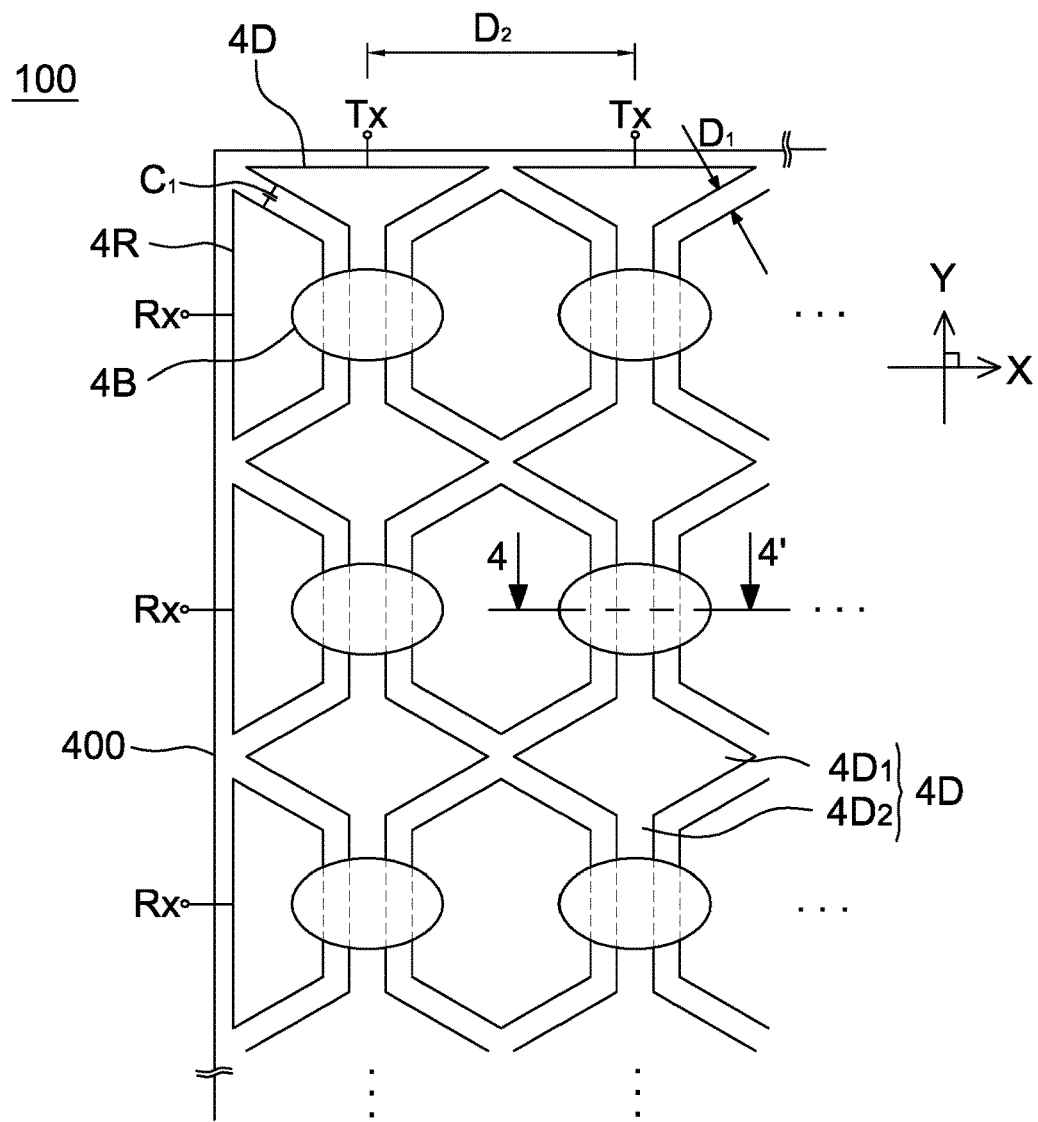
FIG. 4A is a schematic diagram of the electrode arrangement of an input device according to a first embodiment of the present disclosure.
Figure 4B:
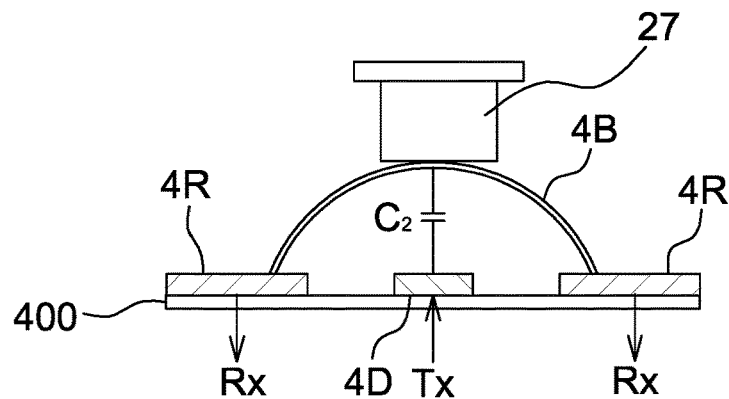
FIG. 4B is a cross sectional view of the input device taken along line 4-4' in FIG. 4A in which a push button is shown not being pressed.

Referring to FIGS. 4A and 4B, FIG. 4A is a schematic diagram of the electrode arrangement of an input device according to a first embodiment of the present disclosure, and FIG. 4B is a cross sectional view of the input device taken along line 4-4' in FIG. 4A in which a push button is shown not being pressed.

The input device 100 of this embodiment includes a substrate 400, a first electrode group, a second electrode group, a plurality of elastic pads 4B and a plurality of push buttons 27, wherein each of the push buttons 27 is opposite to one of the elastic pads 4B. The elastic pads 4B are conductive and deformable due to the external force of the push buttons 27 to change a value of the inductive capacitor. As mentioned above, the elastic pads 4B are metal dome pads or metal snap domes. The substrate 400 is, for example, a PCB or a flexible board.

The first electrode group includes a plurality of first electrodes 4D formed on the substrate 400. For example, the first electrodes 4D are patterned electrodes formed by the photolithography process. Each of the first electrodes 4D extends along a first direction (e.g., Y direction) of the substrate 400. In this embodiment, the first electrodes 4D are used as, for example, drive electrodes and electrically coupled to the drive end Tx of the controller 31 (as shown in FIG. 3). Each of the first electrodes 4D includes a plurality of main body parts $4D_1$ and a plurality of connecting parts $4D_2$, and each of the connecting parts $4D_2$ connects two main body parts $4D_1$ in the first direction of the substrate 400. It should be mentioned that although FIG. 4A shows the main body parts $4D_1$ having a triangular shape or a diamond shape, it is only intended to illustrate but not to limit the present disclosure. It is possible to form the main body parts $4D_1$ as other shapes, e.g., a circle, a semicircle, a trapezoid, a rectangle or a polygon without particular limitations.

The second electrode group includes a plurality of second electrodes 4R separately formed on the substrate 400. For example, the second electrodes 4R are patterned electrodes formed by the photolithography process. The first electrodes 4D and the second electrodes 4R are formed by the same photolithography process and at the same layer of the substrate 400, but not limited to. It is possible that the first electrodes 4D and the second electrodes 4R are formed by different photolithography processes and at different layers of the substrate 400. In this embodiment, the second electrodes 4R are, for example, used as receiving electrodes and electrically coupled to the receiving end Rx of the controller 31 (as shown in FIG. 3). It should be mentioned that although FIG. 4A shows the second electrodes 4R having a trapezoidal shape or a hexagonal shape, it is only intended to illustrate but not to limit the present disclosure. It is possible to form the second electrodes 4R as other shapes, e.g., a circle, a semicircle, a rectangle, a triangle or a polygon without particular limitations. As shown in FIG. 4A, each of the second electrodes 4R are separated by the first electrodes 4D in a second direction (e.g., X direction) without being connected to each other.

In other embodiments, the first electrodes 4D are used as receiving electrodes, while the second electrodes 4R are used as drive electrodes. In other embodiments, the first electrodes 4D extend along the second direction (e.g., X direction), while the second electrodes 4R extend along the first direction (e.g., Y direction). In some embodiments, a number of the first electrodes 4D is equal to a number of rows or a number of columns of the push buttons 27, and a number of rows of the second electrodes 4R (each row having multiple second electrodes) is equal to a number of rows or a number of columns of the push buttons 27.

Each of the elastic pads 4B crosses over, e.g., forming an arch bridge structure, one of the first electrodes 4D in the second direction of the substrate 400 to electrically connect two second electrodes 4R at two sides of the first electrode 4D crossed by said each of the elastic pads 4B. More specifically, the elastic pads 4B have a predetermined distance in a vertical direction from the first electrodes 4D to provide a deforming space for the elastic pads 4B. As mentioned above, each of the first electrodes 4D has a plurality of connecting parts $4D_2$ for connecting two main body parts $4D_1$, and the width (e.g., a width in the second direction) of the connecting parts $4D_2$ is preferable smaller than that of the main body parts $4D_1$ to allow each of the elastic pads 4B to be able to cross over one of the connecting parts $4D_2$ with a smaller distance in the second direction (e.g., X direction) of the substrate 400 to electrically connect two second electrodes 4R at two sides of the connecting part $4D_2$ crossed by said each of the elastic pads 4B. A shape of the elastic pads 4B is not limited to an ellipse. It is possible to form the elastic pads 4B as a circle or other shapes without particular limitations. The size of the elastic pads 4B is arranged corresponding to the push buttons 27. In other embodiments, the first electrodes 4D have an identical width in the first direction (e.g., Y direction).

In the present disclosure, the first electrode group receives a drive signal Sd from the drive end Tx to form a first inductive capacitor $C_1$ between the first electrodes 4D and the second electrodes 4R. As shown in FIG. 4A, a distance between the first electrodes 4D and the second electrodes 4R is, for example, $D_1$, and a value of the first inductive capacitor $C_1$ is determined according to the distance $D_1$, the drive signal Sd, the shape/area of the first electrodes 4D and the second electrodes 4R. For example, edges of the first electrodes 4D and the second electrodes 4R are not straight lines but zig-zag edges. A distance between two adjacent first electrodes 4D is shown as $D_2$ which corresponds to the row distance or column distance of the push buttons 27. In addition, when a conductor (e.g., a finger) approaches to the substrate 400 (or the keyboard module 33), the first inductive capacitor $C_1$ generates a first capacitance variation.

In addition, a second inductive capacitor $C_2$ is formed between each of the elastic pads 4B and the first electrode 4D crossed by said each of the elastic pads 4B, as shown in FIG. 4B. When the elastic pads 4B are pressed by an external force F to deform (as shown in FIG. 5B), the second inductive capacitor $C_2$ generates a second capacitance variation (e.g., from $C_2$ to $C_2'$).

Accordingly, when the push buttons 27 are not pressed, the elastic pads 4B and the second electrodes 4R are taken as one electrode, and the first capacitor $C_1$ formed between the above electrode (i.e. elastic pads 4B and the second electrodes 4R) and the first electrodes 4D is influenced by an external conductor (e.g., a finger) to generate the first capacitance variation such that a detected signal Sr is outputted to the controller 31 (as shown in FIG. 3). The controller 31 then identifies a touch input, for example one of a gesturing control, a scrolling control, a zooming control, a clicking control and a cursor control, but not limited to, according to the detected signal Sr corresponding to the first capacitance variation (e.g., position variation or variation of touch times).

When the push buttons 27 are pressed, the second capacitor $C_2$ formed by the elastic pad 4B corresponding to the pressed push button and the first electrode 4D (e.g., connecting part $4D_2$ thereof) below the elastic pad 4B generates the second capacitance variation due to a distance variation between the elastic pad 4B and the first electrode 4D. For example, the distance between the elastic pad 4B and the first electrode 4D in FIG. 5B is smaller than that in FIG. 4B such that the capacitance is increased. The controller 31 then identifies a push-button input according to a detected signal Sr corresponding to the second capacitance variation. The controller 31 is able to identify the second capacitance variation corresponding to different push buttons 2 to recognize which of the push buttons 27 is pressed to output a corresponding control signal, e.g., showing a corresponding character on a display 35.

In addition, to protect the first electrodes 4D and the second electrodes 4R from oxidation and scratches as well as for isolation, the substrate 400 further has an isolation layer 4P (e.g., the areas filled with slant lines in FIG. 5A) covering on the first electrode group and a part of the second electrode group, wherein each of the second electrodes 4R of the second electrode group has a contact zone $4R_1$ electrically contacting the elastic pads 4B and not covered by the isolation layer 4P.

Figure 5A:
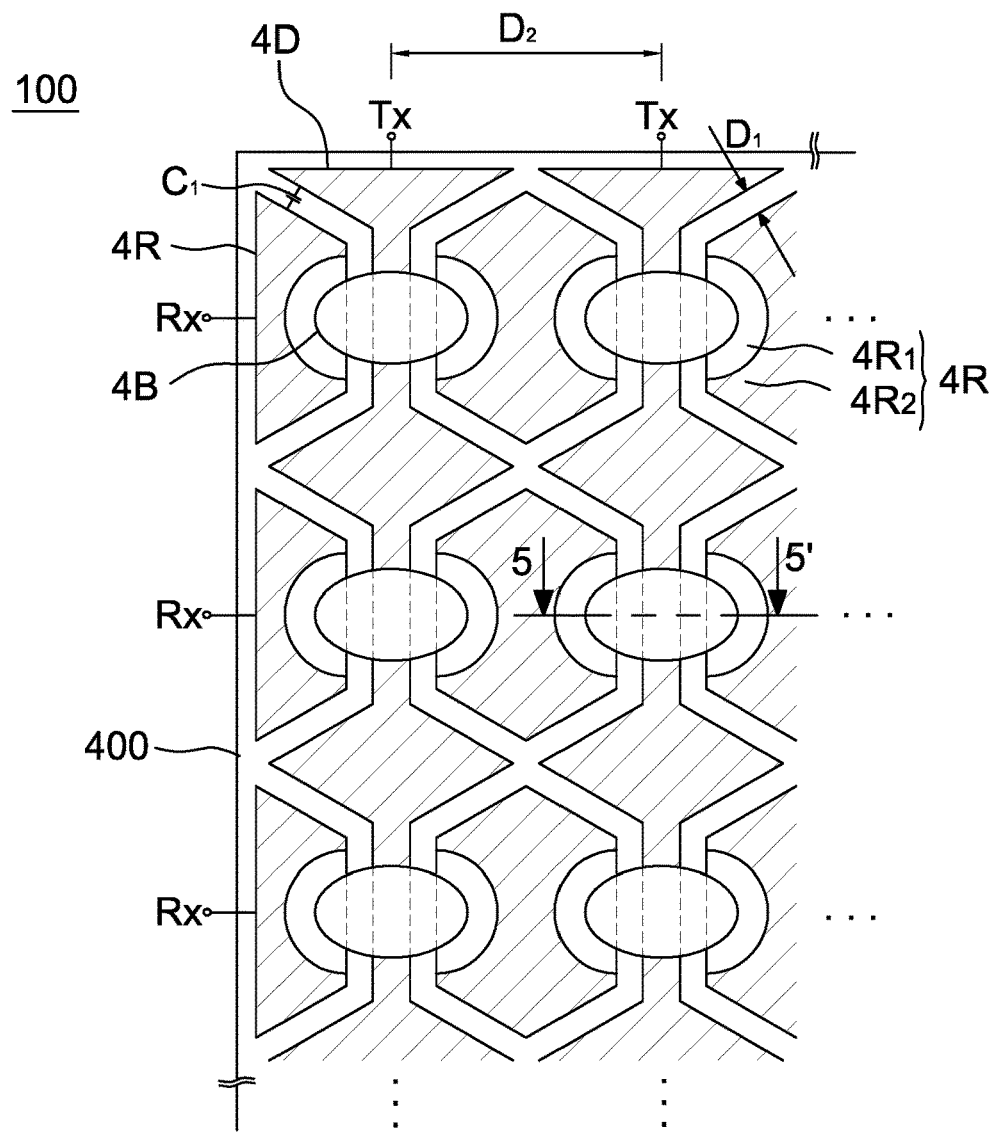
FIG. 5A is a schematic diagram of forming an isolation layer on electrodes of the input device in FIG. 4A.
Figure 5B:
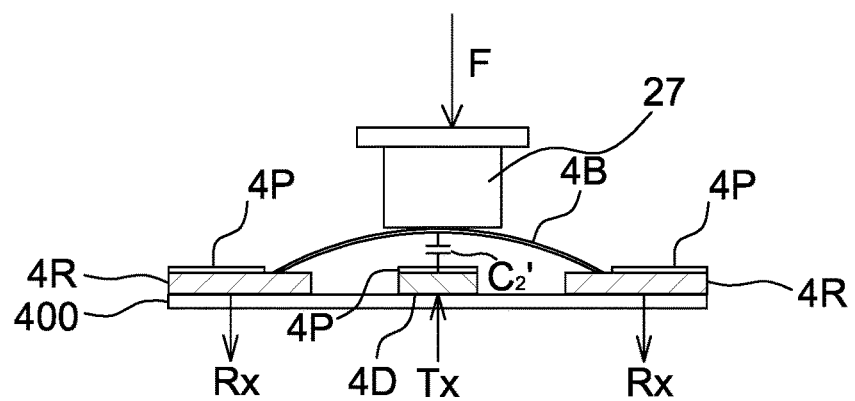
FIG. 5B is a cross sectional view of the input device taken along line 5-5' in FIG. 5A in which a push button is shown being pressed.

It should be mentioned that although FIGS. 5A and 5B show that the isolation layer 4P is formed only on the first electrodes 4D and coating zones $4R_2$ of the second electrodes 4R, it is only intended to illustrate but not to limit the present disclosure. It is possible to form the isolation layer 4P on all areas of the substrate 400 only not on the contact zones $4R_1$ of the second electrodes 4R. It is possible to form the isolation layer 4P on the substrate 400 using conventional methods without particular limitations.

Figure 6A:
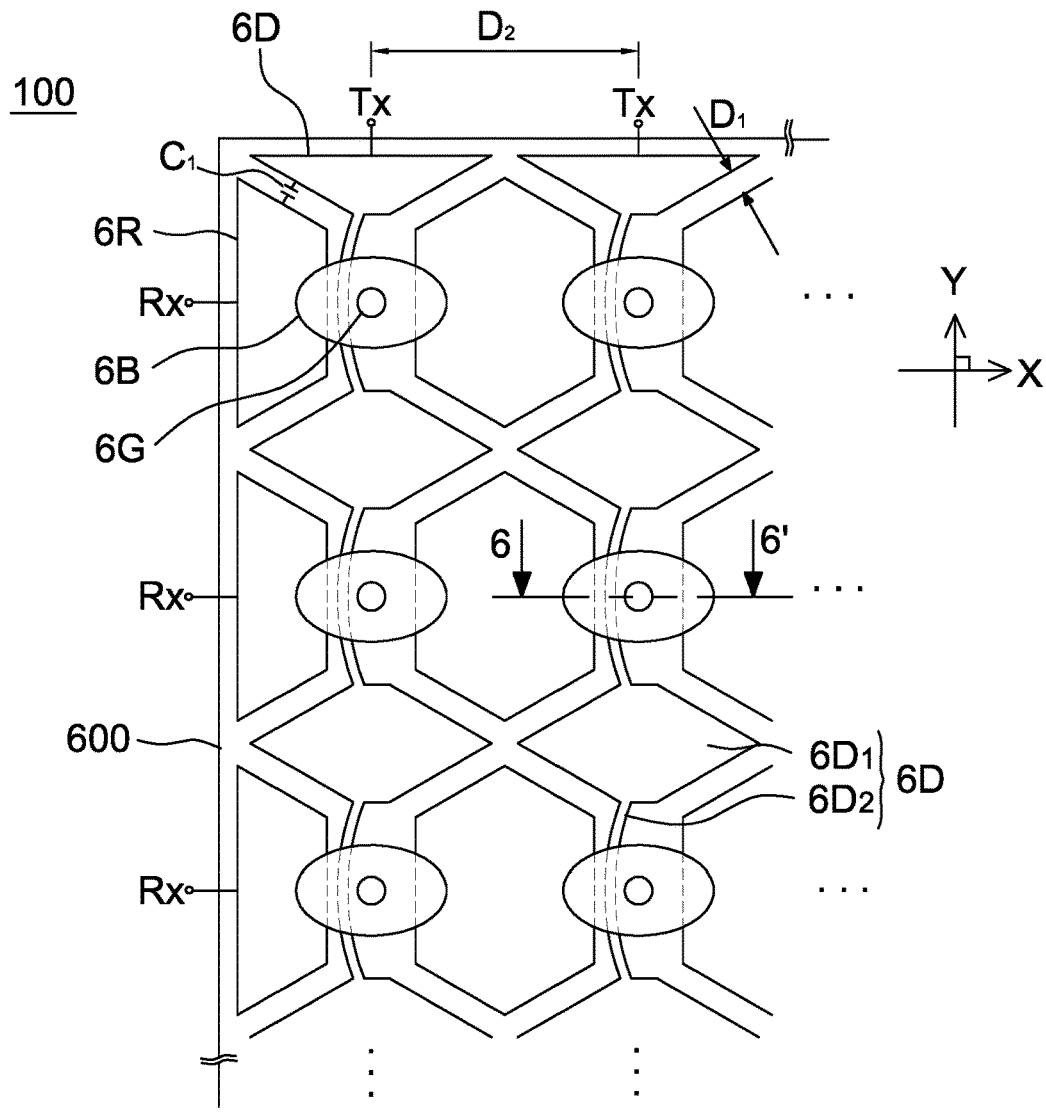
FIG. 6A is a schematic diagram of the electrode arrangement of an input device according to a second embodiment of the present disclosure.
Figure 6B:
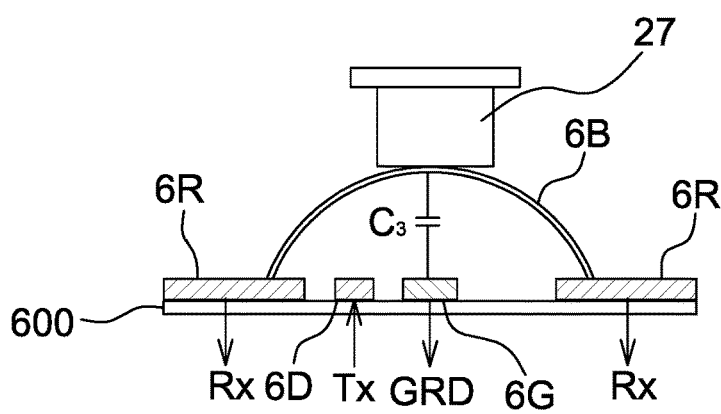
FIG. 6B is a cross sectional view of the input device taken along line 6-6' in FIG. 6A in which a push button is shown not being pressed.

Referring to FIGS. 6A and 6B, FIG. 6A is a schematic diagram of the electrode arrangement of an input device according to a second embodiment of the present disclosure, and FIG. 6B is a cross sectional view of the input device taken along line 6-6' in FIG. 6A in which a push button 27 is shown not being pressed.

The input device of this embodiment includes a substrate 600, a first electrode group, a second electrode group, a plurality of elastic pads 6B, a plurality of ground electrodes 6G and a plurality of push buttons 27, wherein each of the push buttons 27 is opposite to one of the elastic pads 6B. The elastic pads 6B are conductive and deformable due to the external force from the push buttons 27. As mentioned above, the elastic pads 6B are metal dome pads or metal snap domes. The substrate 600 is, for example, a PCB or a flexible board.

The first electrode group includes a plurality of patterned first electrodes 6D formed on the substrate 600. Each of the first electrodes 6D extends along a first direction (e.g., Y direction) of the substrate 600. In this embodiment, the first electrodes 6D are used as, for example, drive electrodes and electrically coupled to the drive end Tx of the controller 31 (as shown in FIG. 3). Each of the first electrodes 6D includes a plurality of main body parts $6D_1$ and a plurality of connecting parts $6D_2$, and each of the connecting parts $6D_2$ connects two main body parts $6D_1$ in the first direction of the substrate 600. It should be mentioned that although FIG. 6A shows the main body parts $6D_1$ having a triangular shape or a diamond shape, it is only intended to illustrate but not to limit the present disclosure. It is possible to form the main body parts $6D_1$ as other shapes, e.g., a circle, a semicircle, a trapezoid, a rectangle or a polygon without particular limitations. It should be mentioned that although FIG. 6A shows that two main body parts $6D_1$ are connected by one connecting part $6D_2$, it is only intended to illustrate but not to limit the present disclosure. In other embodiments, two main body parts $6D_1$ are connected by at least two connecting parts $6D_2$ without particular limitations.

The second electrode group includes a plurality of patterned second electrodes 6R separately formed on the substrate 600. The first electrodes 6D and the second electrodes 6R are formed by the same photolithography process and at the same layer of the substrate 600, but not limited to. In this embodiment, the second electrodes 6R are, for example, used as receiving electrodes and electrically coupled to the receiving end Rx of the controller 31 (as shown in FIG. 3). It should be mentioned that although FIG. 6A shows the second electrodes 6R having a trapezoidal shape or a hexagonal shape, it is only intended to illustrate but not to limit the present disclosure. It is possible to form the second electrodes 6R as other shapes, e.g., a circle, a semicircle, a rectangle, a triangle or a polygon without particular limitations. As shown in FIG. 6A, each of the second electrodes 6R are separated by the first electrodes 6D in a second direction (e.g., X direction) without being connected to each other.

The arrangements of the first electrode group, the second electrode group and the elastic pads of the second and first embodiments are substantially identical only the second embodiment further including a plurality of ground electrodes 6G separately formed on the substrate 600. The ground electrodes 6G are also formed by a photolithography process, and formed together with the first electrode group and the second electrode group using the same manufacturing process, but not limited thereto. In other embodiments, a part of the first electrode group, the second electrode group and the ground electrodes 6G are at different layers of the substrate 600.

Each of the elastic pads 6B crosses over one of the first electrodes 6D and one of the ground electrodes 6G in the second direction of the substrate 600 to electrically connect two second electrodes 6R at two sides of the first electrode 6D crossed by said each of the elastic pads 6B. As mentioned above, each of the first electrodes 6D has a plurality of connecting parts $6D_2$ for connecting two main body parts $6D_1$, and the width (e.g., a width in the second direction) of the connecting parts $6D_2$ is preferable much smaller than that of the two main body parts $6D_1$ to allow each of the elastic pads 6B to be able to cross over one of the connecting parts $6D_2$ and one of the ground electrodes 6G along the second direction of the substrate 600 to electrically connect two second electrodes 6R at two sides of the connecting part $6D_2$ crossed by said each of the elastic pads 6B. Similarly, a shape of the elastic pads 6B is not limited to an ellipse. It is possible to form the elastic pads 6B as a circle or other shapes without particular limitations. Each of the ground electrodes 6G is preferably opposite to a central position of each of the elastic pads 6B. In other words, one push button 27, one elastic pad 6B and one ground electrode 6G are aligned with each other in a vertical direction (e.g., a norm of the substrate 600).

In the present disclosure, the first electrode group receives a drive signal Sd from the drive end Tx to form a first inductive capacitor $C_1$ between the first electrodes 6D and the second electrodes 6R. As shown in FIG. 6A, a distance between the first electrodes 6D and the second electrodes 6R is, for example, $D_1$, and a value of the first inductive capacitor $C_1$ is determined according to the distance $D_1$, the drive signal Sd, the shape/area of the first electrodes 6D and the second electrodes 6R. Similarly, edges of the first electrodes 6D and the second electrodes 6R may not be straight lines but zig-zag edges. A distance between two adjacent first electrodes 6D is shown as $D_2$ which corresponds to the row distance or column distance of the push buttons 27.

In addition, a second inductive capacitor $C_3$ is formed between each of the elastic pads 6B and the ground electrode 6D crossed by said each of the elastic pads 6B, as shown in FIG. 6B. When the elastic pads 6B are pressed by an external force F to deform (as shown in FIG. 7B), the second inductive capacitor $C_3$ generates a second capacitance variation (e.g., from $C_3$ to $C_3'$). When a conductor (e.g., a finger)

approaches to the substrate 600 (or the keyboard module 33), the first inductive capacitor $C_1$ generates a first capacitance variation (e.g., capacitance decreasing). In this embodiment, as the second inductive capacitor $C_3$ is mainly formed between the ground electrodes 6G and the elastic pads 6B, a better stability is realized. In this embodiment, as the connecting parts $6D_2$ of the first electrodes 6D are not mainly used to induct the second capacitance variation with the elastic pads 6B, the width of the connecting parts $6D_2$ of the first electrodes 6D may be formed narrower as long as two main body parts $6D_1$ are electrically connected thereby. In some embodiments, it is possible to arrange the width of the connecting parts $6D_2$ of the first electrodes 6D identical to that in the first embodiment to form another inductive capacitor with the elastic pads 6B.

Accordingly, when the push buttons 27 are not pressed, the elastic pads 6B and the second electrodes 6R are taken as one electrode, and the first capacitor $C_1$ formed between the above electrode (i.e., elastic pads 6B and second electrodes 6R) and the first electrodes 6D is influenced by an external conductor (e.g., a finger) to generate the first capacitance variation such that a detected signal Sr is outputted to the controller 31 (as shown in FIG. 3). The controller 31 then identifies a touch input, for example one of a gesturing control, a scrolling control, a zooming control, a clicking control and a cursor control, according to the detected signal Sr.

When the push buttons 27 are pressed, the second capacitor $C_3$ formed between the elastic pad 6B corresponding to the pressed push button and the ground electrode 6G below the elastic pad 6B generates the second capacitance variation due to a distance change between the elastic pad 6B and the ground electrode 6D. For example, the distance between the elastic pad 6B and the ground electrode 6G in FIG. 7B is smaller than that in FIG. 6B such that the capacitance is increased. The controller 31 identifies a push-button input according to a detected signal Sr, and the controller 31 is able to distinguish the second capacitance variation corresponding to different push buttons 2 to recognize which of the push buttons 27 is pressed to output a corresponding control signal, e.g., showing a corresponding character on a display 35.

Similarly, to protect the first electrodes 6D, the second electrodes 6R and the ground electrodes 6G from oxidation and scratches as well as for isolation, the substrate 600 further has an isolation layer 6P (e.g., the areas filled with slant lines in FIG. 7A) covering on the first electrode group, the ground electrodes 6G and a part of the second electrode group, wherein each of the second electrodes 6R of the second electrode group has a contact zone $6R_1$ electrically contacting the elastic pads 6B and not covered by the isolation layer 6P.

Figure 7A:
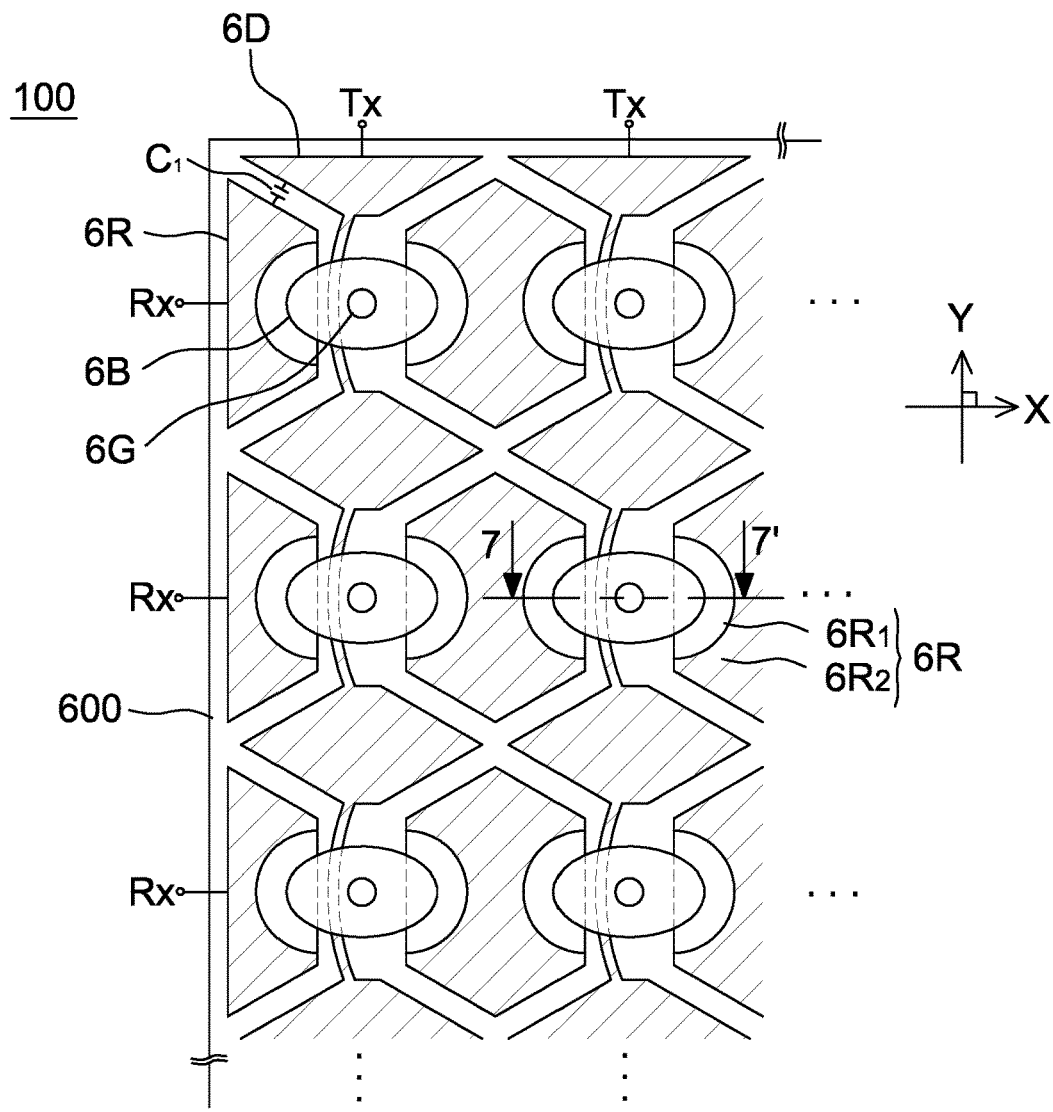
FIG. 7A is a schematic diagram of forming an isolation layer on electrodes of the input device in FIG. 6A.
Figure 7B:
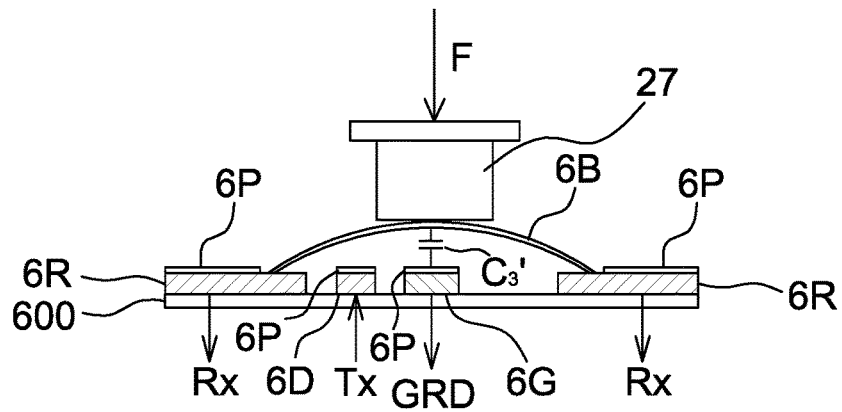
FIG. 7B is a cross sectional view of the input device taken along line 7-7' in FIG. 7A in which a push button is shown being pressed.

It should be mentioned that although FIGS. 7A and 7B show that the isolation layer 6P is formed only on the first electrodes 6D, the ground electrodes 6G and the coating zones $6R_2$ of the second electrodes 6R, it is only intended to illustrate but not to limit the present disclosure. It is possible to form the isolation layer 6P on all areas of the substrate 600 only not on the contact zones $6R_1$ of the second electrodes 6R. It is possible to form the isolation layer 6P on the substrate 600 using conventional methods without particular limitations.

Figure 8:
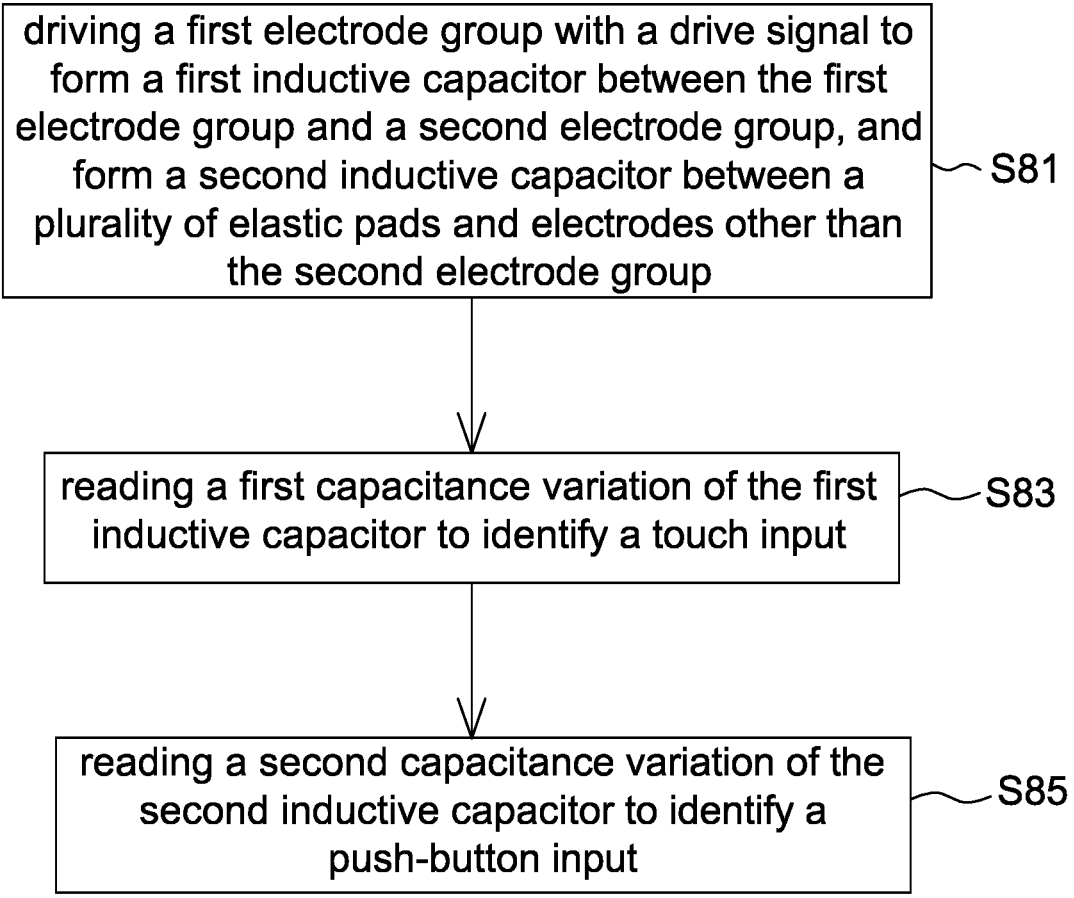
FIG. 8 is a flow chart of an operating method of an input device according to one embodiment of the present disclosure.

Referring to FIG. 8, it is a flow chart of an operating method of an input device according to one embodiment of the present disclosure, wherein the operating method is adaptable to the above first and second embodiments. The operating method includes the steps of: driving a first electrode group with a drive signal to form a first inductive capacitor between the first electrode group and a second electrode group and form a second inductive capacitor between a plurality of elastic pads and electrodes other than the second electrode group (Step S81); reading a first capacitance variation of the first inductive capacitor to identify a touch input (Step S83); and reading a second capacitance variation of the second inductive capacitor to identify a push-button input (Step S85).

Step S81: When the operating method of this embodiment is adapted to the above first embodiment, the electrodes other than the second electrode group 4R are referred to the connecting parts $4D_2$ of the first electrode group 4D (as shown in FIG. 4A). Accordingly, the controller 31 drives first electrodes of the first electrode group respectively using a drive signal Sd (as shown in FIG. 3) to form a first inductive capacitor $C_1$ between the first electrode group and the second electrode group, and form a second inductive capacitor $C_2$ between the elastic pads 4B and the connecting parts $4D_2$ of the first electrode group 4D (as shown in FIGS. 4A and 4B). For example, the electric field between the first electrode group and the second electrode group is substantially parallel to a surface of the substrate 400, and the electric field between the elastic pads 4B and the connecting parts $4D_2$ is substantially perpendicular to the surface of the substrate 400.

When the operating method of this embodiment is adapted to the above second embodiment, the electrodes other than the second electrode group 6R are referred to the ground electrodes 6G (as shown in FIGS. 6A-6B), wherein the ground electrodes 6G are separated from the first electrode group 6D and the second electrode group 6R on the substrate 600. The ground electrodes 6G are all connected to one ground pin GRD of the controller 31. Accordingly, the controller 31 drives first electrodes of the first electrode group respectively using a drive signal Sd (as shown in FIG. 3) to form a first inductive capacitor $C_1$ between the first electrode group and the second electrode group, and form a second inductive capacitor $C_3$ between the elastic pads 6B and the ground electrodes 6G (as shown in FIGS. 6A and 6B). For example, the electric field between the first electrode group and the second electrode group is substantially parallel to a surface of the substrate 600, and the electric field between the elastic pads 6B and the ground electrodes 6G is substantially perpendicular to the surface of the substrate 600.

In this operating method, the controller 31 drives the first electrodes of the first electrode group sequentially or concurrently. When a concurrent driving scheme is used, the controller 31 further performs the phase modulation or frequency modulation as well as encoding procedure on the drive signal Sd so as to distinguish the position having the second capacitance variation.

Steps S82-S83: In this embodiment, the controller 31 is able to distinguish the touch input and the push-button input. For example, when the capacitance value is identified to become smaller, it is able to identify that a touch input occurs (e.g., from the first capacitance variation of the first inductive capacitor $C_1$) and identify the touch position and/or touch times thereby identifying one of a gesturing control, a scrolling control, a zooming control, a clicking control and a cursor control. For example, when the capacitance value is identified to become larger, it is able to identify that a push-button input occurs (e.g., from the second capacitance variation of the second inductive capacitor $C_2$, $C_3$), and identify a position of the push-button being pressed to generate a corresponding control signal, e.g., showing characters on the display 35, but not limited thereto.

It is appreciated that a number of push buttons 27 and the element size in the above embodiments are only intended to illustrate but not to limit the present disclosure. In the present disclosure, the controller 31 receives detected signals Sr corresponding to the first capacitance variation and the second capacitance variation via at least one identical detection pin 311 to detect the first capacitance variation and the second capacitance variation.

It should be mentioned that although the first electrode ground in the above embodiments is illustrated by an example including a plurality of first electrodes, the present disclosure is not limited thereto. In other embodiments, the first electrode group includes a single first electrode extending along the first direction (e.g. Y direction), while the second electrode group still includes multiple second electrodes, or vice versa. That is, it is possible that the input device of the present disclosure includes one row or one column of push buttons 27 which correspond to one row or one column of elastic pads 25, and an input device having both the push-button input and the touch input is also implementable.

As mentioned above, the conventional push-button keyboard only has the function of push-button input by pressing keys such that applications thereof are limited. Therefore, the present disclosure further provides an input device (as shown in FIGS. 4A, 5A, 6A and 7A) and an operating method thereof (as shown in FIG. 8) that have both the push-button input function and the touch input function to be adaptable to various electronic devices having a keyboard module such as portable electronic devices, home appliances, vehicle devices and computer systems.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An input device comprising:
    a substrate;
    a first electrode group, a second electrode group and a plurality of ground electrodes arranged at a same level on the substrate, wherein
        the first electrode group comprises at least one first electrode formed on the substrate, the at least one first electrode extending along a first direction of the substrate,
        the second electrode group comprises a plurality of second electrodes, wherein the plurality of second electrodes are arranged as multiple separated rows, and each of said multiple separated rows includes multiple second electrodes separately arranged along a second direction of the substrate, and
        the plurality of ground electrodes are separately formed on the substrate, wherein each of the plurality of ground electrodes is respectively arranged between two adjacent second electrodes in one of said multiple separated rows; and
    a plurality of elastic pads each crossing over the at least one first electrode and one of the ground electrodes along the second direction of the substrate to electrically contact the two adjacent second electrodes in one of said multiple separated rows and at two sides of the first electrode crossed thereby.

2. The input device as claimed in claim 1, wherein
the at least one first electrode comprises a plurality of main body parts and a plurality of connecting parts, and each of the connecting parts connects two main body parts along the first direction of the substrate and is adjacent to one of the ground electrodes.

3. The input device as claimed in claim 2, wherein
each of the elastic pads crosses over one of the connecting parts and one of the ground electrodes along the second direction of the substrate to electrically connect the two adjacent second electrodes at two sides of the connecting part crossed thereby.

4. The input device as claimed in claim 2, wherein
the plurality of ground electrodes are arranged as an array on the substrate, and each of the plurality of ground electrodes is respectively arranged between two adjacent second electrodes in one of said multiple separated rows and between two adjacent main body parts of the at least one first electrode.

5. The input device as claimed in claim 2, wherein
each of the connecting parts of the at least one first electrode is arranged between one of the plurality of ground electrodes and one of the two adjacent second electrodes in one of said multiple separated rows.

6. The input device as claimed in claim 2, wherein
a layout of each of the connecting parts of the at least one first electrode forms a curve between two main body parts connected thereby, and
said one of the ground electrodes is opposite to a central position of the elastic pad crossing thereover.

7. The input device as claimed in claim 1, wherein
each of the plurality of ground electrodes is not arranged in the first direction between two adjacent rows among said multiple separated rows.

8. The input device as claimed in claim 1, wherein
the first electrode group is configured to receive a drive signal from a controller to form a first inductive capacitor between the at least one first electrode and the second electrodes and a second inductive capacitor between each of the ground electrodes and a corresponding elastic pad.

9. The input device as claimed in claim 8, wherein
in response to a conductor approaching the substrate, the first inductive capacitor is configured to generate a capacitance decrease, and
in response to a press on the corresponding elastic pad, the second inductive capacitor is configured to generate a capacitance increase.

10. The input device as claimed in claim 9, wherein the controller is configured to
identify a touch input according to the capacitance decrease and identify a push-button input according to the capacitance increase, and
detect both the capacitance decrease and the capacitance increase via at least one identical pin.

11. The input device as claimed in claim 1, further comprising:
a plurality of push buttons respectively opposite to the plurality of elastic pads.

12. The input device as claimed in claim 1, further comprising:
an isolation layer covered on the first electrode group, the ground electrodes and a part of the second electrode group, wherein each of the second electrodes of the second electrode group has a contact zone not covered by the isolation layer and electrically connected to one of the elastic pads.

13. An operating method of an input device of claim 1, the input device further comprising a drive end coupled to the first electrode group and a receiving end coupled to the second electrode group, the operating method comprising:
   driving the first electrode group with a drive signal to form a first inductive capacitor between the first electrode group and the second electrode group and form a second inductive capacitor between the elastic pads and the ground electrodes;
   reading a capacitance decrease of the first inductive capacitor to identify a touch input; and
   reading a capacitance increase of the second inductive capacitor to identify a push-button input.

14. The operating method as claimed in claim 13, wherein the touch input comprises at least one of a gesturing control, a scrolling control, a zooming control, a clicking control and a cursor control.

15. The operating method as claimed in claim 13, wherein the input device comprises multiple first electrode groups, and
   the drive end outputs the drive signal to sequentially or concurrently drive the multiple first electrode groups.

16. An input device, comprising:
   a substrate;
   a first electrode group and a second electrode group arranged at a same level on the substrate, wherein
      the first electrode group comprises at least one first electrode formed on the substrate and extending along a first direction of the substrate, wherein the at least one first electrode comprises a plurality of main body parts and a plurality of connecting parts each connecting two of the plurality of main body parts, and a width in a second direction of each of the main body parts is larger than that of each of the connecting parts, and
      the second electrode group comprises a plurality of second electrodes, wherein the plurality of second electrodes are arranged as multiple separated rows, and each of said multiple separated rows includes multiple second electrodes separately arranged along the second direction of the substrate; and
   a plurality of elastic pads each crossing over one of said plurality of connecting parts of the at least one first electrode along the second direction of the substrate to electrically contact two adjacent second electrodes in one of said multiple separated rows and at two sides of the connecting part crossed thereby,
   wherein the first electrode group is configured to receive a drive signal from a controller to form a first inductive capacitor between the at least one first electrode and the second electrodes, and a second inductive capacitor between each of the connecting parts and a corresponding elastic pad.

17. The input device as claimed in claim 16, further comprising:
   a plurality of push buttons respectively opposite to the plurality of elastic pads.

18. The input device as claimed in claim 16, further comprising:
   an isolation layer covered on the first electrode group and a part of the second electrode group,
   wherein each of the second electrodes of the second electrode group has a contact zone not covered by the isolation layer and electrically connected to one of the elastic pads.

19. The input device as claimed in claim 16, wherein
   in response to a conductor approaching the substrate, the first inductive capacitor is configured to generate a capacitance decrease, and
   in response to a press on the corresponding elastic pad, the second inductive capacitor is configured to generate a capacitance increase.

* * * * *